United States Patent [19]

Morper

[11] Patent Number: 4,627,917
[45] Date of Patent: Dec. 9, 1986

[54] PROCESS FOR THE ANAEROBIC DECOMPOSITION OF ORGANIC SUBSTRATE

[75] Inventor: Manfred Morper, Gauting, Fed. Rep. of Germany

[73] Assignee: Linde Aktiengesellschaft, Wiesbaden, Fed. Rep. of Germany

[21] Appl. No.: 725,279

[22] Filed: Apr. 19, 1985

[30] Foreign Application Priority Data

Apr. 19, 1984 [DE] Fed. Rep. of Germany ....... 3414999

[51] Int. Cl.$^4$ .............................................. C02F 3/28
[52] U.S. Cl. .................................... 210/617; 210/150
[58] Field of Search ....................... 210/603, 615–618, 210/150, 151, 629, 630, 605, 607

[56] References Cited

U.S. PATENT DOCUMENTS

| 3,371,033 | 2/1968 | Simmons et al. | 210/150 X |
| 4,256,573 | 3/1981 | Shimodaira et al. | 210/618 |
| 4,351,729 | 9/1982 | Witt | 210/617 X |

Primary Examiner—Tom Wyse
Attorney, Agent, or Firm—Millen & White

[57] ABSTRACT

This invention relates to a process and device for anaerobic decomposition of organic substrate in which organic substrate to be treated is passed in a downflow mode through a reactor (1) having a filter bed therein as a carrier for settling microorganisms. The substrate treated in filter bed (3) is partially recycled by a recycle pipe 4 from the bottom to the top of reactor (1). Produced digester gas is drawn off by a gas outlet (9) at top of reactor (1). To maintain a high volume load and to achieve high operational stability, it is provided that a partial stream of substrate treated in filter bed (3) is passed in an upflow mode through a riser pipe (11) to effect further degradation of residuals and is drawn off at the top of reactor (1) by means an outlet (10) directly from the riser pipe (11).

8 Claims, 2 Drawing Figures

PROCESS FOR THE ANAEROBIC DECOMPOSITION OF ORGANIC SUBSTRATE

BACKGROUND OF THE INVENTION

This invention relates to a process and device for the anaerobic decomposition or degradation of a waste stream containing organic substrate in which the organic substrate being treated is conducted in a downflow mode through a filter bed arranged in a treatment zone, i.e., a reactor. The filter bed serves as a carrier for the settling of microorganisms therein or thereon, and with the substrate which has been treated, at least in part, in the filter bed, being recycled from the bottom or lower region to the top of the treatment zone for being passed therethrough again for further treatment or degradation.

In typical processes of this type wherein anaerobic microbal transformation, i.e., degradation, of organic substrate primarily into methane and carbon dioxide is effected, there is presented a significant problem since, in the case of complex substrate materials, i.e., a portion of the organic load, expressed as COD, is present in a form that is difficult to metabolize, e.g., as undissolved solids, polymers or polycondensed aromatics. Wastes of this kind are obtained e.g. from the food industry or the chemical industry with the complex substrates being e.g. fats, proteins, carbohydrates, phthalic acids etc.

These substances must first be decomposed into smaller parts or substances that can then be attacked by fermentative bacteria. As a result of this two stage reaction, long reaction times and large-volume reactors are required. Therefore, in order to reduce reaction times, anaerobic high-efficiency reactors are used which, as a rule, are designed as upflow sludge bed reactors, or as downflow filter bed reactors. In both types of reactors, large volumes are required to achieve adequate decomposition performances which can be achieved only by a high degree of retention of the only slowly reproducing anaerobic biomass therein.

A recent summary of anaerobic processes and anaerobic reactors presently in use is given by R. E. Speece in Environm. Sci. Technol. Vol. 17. No. 9 (1983), pages 416 to 427.

In the case of the use of an upflow type sludge reactor, there is the danger, especially in the case when there occurs a high hydraulic load, and/or with high specific generation of gas, that the efficiency of the reactor will be reduced by sludge decanting from the top through the discharge thereof, which results in a loss of active biomass and consequently reduced efficiency. Investigations with distillery waste showed, that increased sludge losses occurred with specific gas production rates above 4 $m^3/m^3$ of reactor volume. Furthermore, achievement of a highly concentrated sludge bed depends on the availability of granular sludge settling which settles well, the formation of which cannot be controlled in this type of reactor.

In the case a downflow filter bed reactor is used, a substantial portion of the biomass is firmly fixed to surfaces of support elements therein, or, in the case support elements having an open cell structure are used, the biomass is fixed in the interior of the support elements. In order to obtain a thorough mixing, to avoid clogging, and/or load equalizing in the case of peak loads, a partial stream which is a multiple of the feed stream is recycled from the bottom to the top of the filter bed. As contrasted with an upflow type reactor, loading in downflow operation has the advantage that no process impairing foaming occurs. However, a disadvantage is presented in that a substantial portion of the unfixed, i.e., suspended, biomass therein will be flushed out from the reactor with the purified effluent. Thus, the decomposition performance of the reactor is hampered. Furthermore, there results a relatively increased fatty acid content in the effluent, as compared to an upflow type reactor, that results in annoying odors since it is not possible to recycle the entire quantity of the feed stream and thus, a portion of the feed remains in the reactor for only a relatively short time which is insufficient to effect full or complete degradation.

SUMMARY OF THE INVENTION

It is thus an object of the invention to provide a process of the above-described type which avoids the above-described disadvantages in a simple and economical manner, and which is capable of treating a high volume load with high operating stability, and in combination therewith, a high degradation efficiency is achieved.

It is another object of the invention to provide a device for conducting the process according to the invention.

Upon further study of the specification and appended claims, further objects and advantages of this invention will become apparent to those skilled in the art.

In accordance with the invention, wastewater containing organic substrate is degraded or decomposed by anaerobic microorganisms. The wastewater is passed through a filter bed arranged in a treatment zone or reactor. The filter bed serves as a carrier for having said microorganisms settled, i.e., carried, therein and/or thereon, and with a partial recycle of the treated stream being passed, along with substrate being treated, back to the inlet of the zone or reactor.

The improvement resides in conducting the wastewater containing organic substrate being treated in a downflow mode through the filter bed to thereby treat the organic substrate. The recycle is conducted by separating a partial stream of substrate containing partially treated wastewater at the bottom of the treatment zone and passing it to the top. Another partial stream of at least partially treated substrate is passed in an upflow mode to effect further treatment with treated effluent being separated from said other partial stream, and discharged in purified condition from a region in the vicinity of the top of the treatment zone.

By conducting the process in this manner, one advantage is that the probability is substantially reduced that a portion of the feed will be removed from the treatment zone in only partially treated condition as compared to a downflow mode of operation. On the other hand, it is also assured that unfixed biomass remains in the treatment zone and thus, the total concentration of fixed and unfixed suspended biomass is kept very high. Compared to prior art downflow fixed bed reactors in a reactor according to the invention overall active biomass conentration will be higher by 10–20% according to improved retention of unfixed biomass. Thus, the treatment zones operated according to the invention can be about 15–20% more heavily loaded than treatment zones operated according to the previously discussed traditional processes, or they can be designed of smaller size, so that the decomposition performance per unit volume is extremely high.

This enhanced size efficiency can be attributed to the fact that during the rise of the substrate-containing partial stream in the upflow, separate from the filter bed, and separate from the recycle, on the one hand the decomposition process is continued because biomass is suspended in the substrate, and, on the other hand, due to the relative path length of the upflow, the suspended biomass is gradually separated from the liquid. Settling in the conduits through which the upflow is passed occurs because liquid velocity there is only equivalent to the influent flow, which is much lower than liquid velocity in the recycle pipe where the flow is a multiple (typically more than ten times higher) of the influent flow thus preventing any significant settling of active biomass. Settling efficiency is of course also affected by the overall cross section area of all the riser pipes. This separation of the unfixed biomass and liquid thus results in a portion of the free or suspended and unfixed biomass sinking or settling towards the lower region or bottom of the treatment zone, and again being recirculated to the upper area or top of the treatment zone due to the various fluid flows therein as well as the recycle stream. A sludge bed thus forms in the upflow, inasmuch as particles with nor or slow motion (according to size and weight) are retained in the riser pipe. In the sludge bed that forms during the upflow, which is separate from the filter bed, and by the sludge layer that forms on the surface of the riser pipes odorous intermediate products can be almost completely eliminated before discharge. In this case, the upflow can be conducted in an upward stream arranged alternatively on the inside and/or the outside of the treatment zone.

It is preferable to pass the upflow in contact with microorganisms fixed to or within the conduit through which the upflow is passed. Thus, the share of the total firmly fixed, carried or settled biomass present in the treatment zone can be further increased, and the residual decomposition of organic substrate remaining after passage through the filter bed and the removal of strongly odorous fatty acids during the upflow is greatly enhanced.

In order to further enhance the performance of the process, it is advantageous to conduct the upflow along an appropriately designed path, for example, a tortuous path, since the length of reaction path will thus be lengthened. Moreover, it is, as a result of using a tortuous path such as a coiled path, possible to prevent the digester gas, which develops because of the decomposition processes even during the upflow, from vertically rising to the top in a direct path and from carrying suspended biomass directly upwards due to a flotation effect.

As the source organic substrate which can be decomposed according to the process of the invention, and can be used for digester gas production, there is especially included urban and industrial sewage, sewage sludge as well as organic residual and waste materials. In order to process organic solids, sufficient cell and surface water must be available, i.e. the added substrate must have liquid behavior. In order to enable the degradation of solid organic wastes, enough water must be added and the particle size must be diminished, so that the resulting slurry has the basic characteristics of a liquid.

The device for conducting the process of the invention comprises a reactor constructed for operation in an essentially downflow mode under anaerobic conditions. The reactor contains a filter bed arranged therein which serves as a carrier for settling of microorganisms. The reactor includes a feed pipe or inlet for the above mentioned substrate to be treated, an outlet for treated substrate, a gas outlet for digester gas and a return or recycle pipe or conduit from the bottom to the top of the reactor. According to the device of the invention, at least one riser pipe is placed inside and/or outside the filter bed, and the riser pipe is connected at the top or near the top of the reactor to an outlet for treated substrate, i.e., effluent.

With such a reactor, loading of the reactor with organic substrate to be treated, and with partially treated substrate recycled by the recycle pipe, takes place in a downflow operation mode, and discharge through the riser pipes from the bottom of the reactor to the discharge point at the top of the reactor takes place in an upflow type operation. As a result, this prevents any portion of the feed from leaving the reactor untreated. More particularly, the free, suspended and unfixed biomass will settle downwardly during the rise of the liquid through the riser pipes, so that the reactor outlet is largely free of suspended substances.

The settled biomass is recycled from the bottom to the top of the reactor by the recycle pipe and fed for further treatment into the filter bed. As a consequence, the concentration of free, unfixed and suspended biomass in the reactor is thereby increased and the total concentration of fixed and suspended biomass, from which a high decomposition performance of the reactor results, is thereby increased.

In view of a high COD load, i.e., above 10 kg $COD/m^3 \cdot d$ and fatty acid decomposition, it is especially advantageous if the riser pipes are, as previously discussed, tortuous in nature and have a corrugated and/or ribbed surface. Such riser pipes can be, e.g., plastic pipes as produced as inexpensive mass-produced articles for use as empty conduits for electric installations or drainage pipes. The corrugated and/or ribbed surface of the rising pipes provide growth surfaces for the active biomass both on the outside, and on the inside surfaces when the pipes are arranged inside the filter bed itself. As a result, on the one hand, the concentration of the active biomass is kept at least as high as if the filter bed does not include the riser pipes therein, despite the loss of filter bed volume which occurs with the arrangement of one or more riser pipes in the bed. On the other hand, the biomass settling on the inside walls of the riser pipes, through which the effluent substrate passes by in the upflow operation, causes further reduction of the COD effluent concentration and decomposition of strongly odorous fatty acids.

By means of the corrugated or ribbed design of the surface of the rising pipes, microturbulences develop or are created in the rising flow of liquid, which can make thorough mixing of free biomass and substrate possible. This is because the upward flow is not a straight line flow and instead the fluid flows, at least through a portion thereof, through a tortuous path. In view of the residual decomposition occurring in the riser pipes, this effect is entirely desirable. However, for the sedimentation of free biomass before discharge, this effect is more of a hindrance. For this reason it is advantageous to provide the riser pipes with a corrugated and/or ribbed surface, typically only in the lower half, and in the upper half area to provide a largely straight and flat surface for a straight line flow. In this manner, stabilization of the flow conditions in the upper area of the riser pipes can be achieved, this stabilization being useful for the sedimentation process. The surface of the riser pipes, at least in the upper area, may also have an open-pore structure which favors the settling of microorganisms on the outside and on the inside. For this purpose the inside and outside surface of the riser pipes may be covered with a plastic foam layer with an open pore structure which provides large surfaces for the growth of fixed microorganisms on the inside and the outside of the riser pipes.

To intensify or increase the sedimentation and decomposition process in the riser pipes, it is furthermore advantageous to make them of inclined or coiled construction. By this arrangement not only is the rising path of the substrate from the reactor bottom to the outlet in the upper area of the reactor lengthened, which improves the effectiveness of the decomposition and of the sedimentation in this area of the reactor, but also at the same time, in the decomposition or degradation processes, the digester gas developing in the riser pipes during the upflow is prevented from rising vertically in a direct path. Thus, a flotation and discharge movement of the unfixed biomass caused by such a rise of gas is at least restricted. In addition, in the corrugated and/or ribbed design of the inclined or coiled arrangement of the rising pipe, the developing digester gas may accumulate in the respective recesses of the riser pipes. The rising movement of the digester gas thus is significantly slowed down, so that flotation processes caused by such rising gas are thereby largely eliminated.

BRIEF DESCRIPTION OF THE DRAWING

Various other objects, features and attendant advantages of the present invention will be more fully appreciated as the same becomes better understood when considered in conjunction with the accompanying drawing, in which like reference characters designate the same or similar parts throughout the several views, and wherein.

The drawing diagrammatically illustrates a reactor conducting the process according to the invention.

DETAILED DISCUSSION OF THE INVENTION

Figure 1:
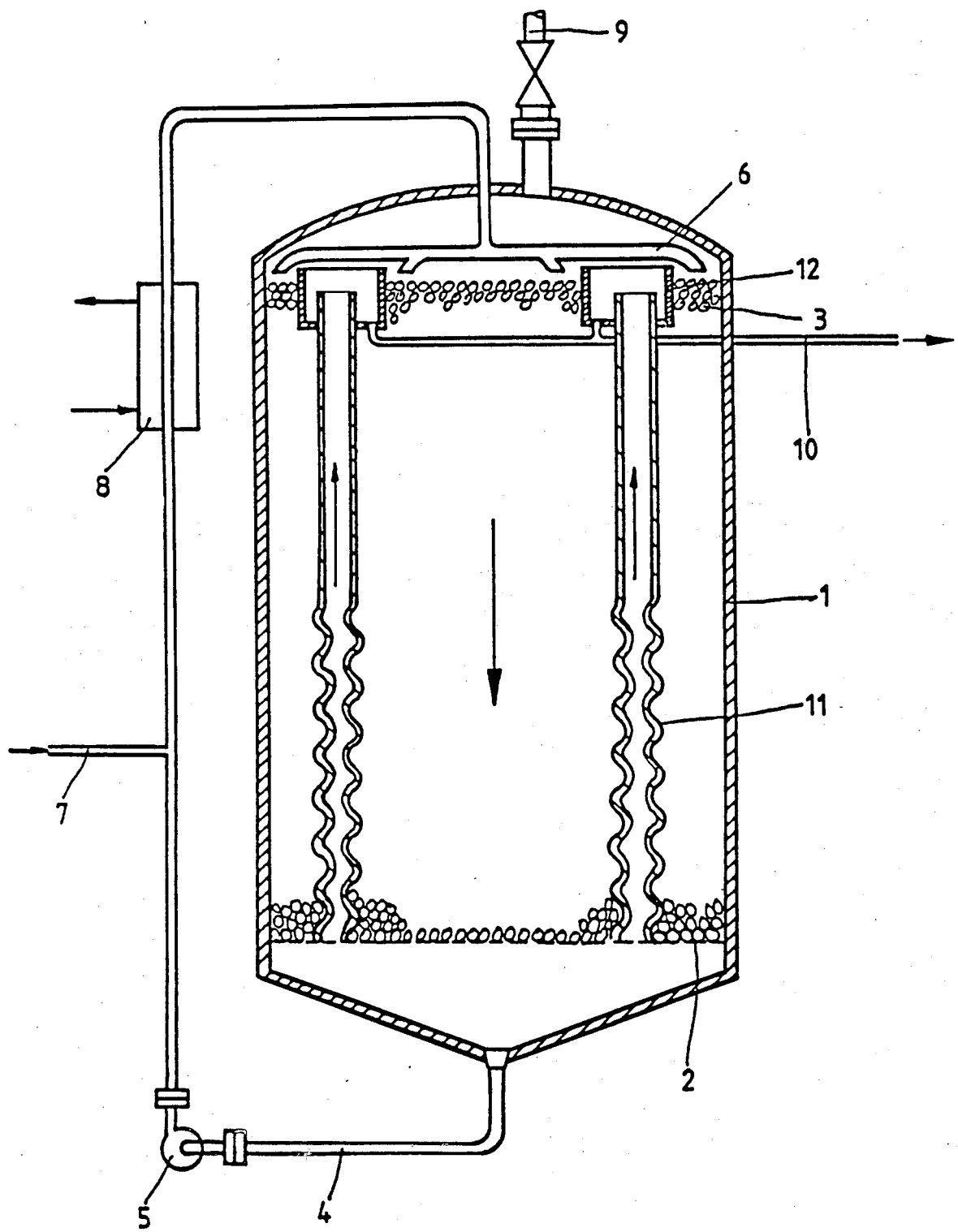
FIG. 1 illustrates an anaerobic reactor with at least one riser pipe passing through the filter bed located inside of the reactor.

In the figure a closed and sealed reactor, operated under anaerobic conditions, is identified as 1 and includes a filter bed 3 supported on a screen or grid bottom 2 present at the bottom thereof. A recycle pipe 4 with pump 5 leads from the bottom of reactor 1 below the screen or grid bottom 2 to a distribution device 6, i.e., discharge, arranged at the top of reactor 1 over the submerged filter bed 3. A feed pipe 7 for the influent organic substrate stream to be treated is connected to recycle pipe 4, so that substrate to be treated, or partially treated, flows from the top down into the reactor by way of distribution device 6 through filter bed 3 of reactor 1. To maintain the temperatures most favorable to the anaerobic process, a heat exchanger 8 is placed e.g. in the return pipe, but can also be placed in the influent pipe. To be able to avoid excessive heat loss from reactor 1, the latter is advantageously packed with insulation (not shown). The purpose of the heat exchanger and the reactor insulation is to maintain a favorable constant reactor temperature of preferably 32° to 37° C. Position and type of heat exchanger and insulation material may therefore be chosen according to convenience. The digester gas developing during the anaerobic decomposition process is carried off by means of a gas outlet 9 provided at the top of reactor 1, while treated substrate is drawn off through outlet 10.

The filter bed 3 in this instance is designed as a solid or packed bed and may consist, e.g., of sand, light weight expanded clay, slag, activated carbon, plastic rings, or preferably of open-cell foamed plastic elements, such as polyurethane, polyethylene, or polypropylene elements, or of mixtures of the various materials. If foamed plastic are used as filter elements, the pore size should range preferably between 0.1 and 3 mm to ensure that the anaerobic microorganisms not only adhere to the surface of the filter elements but also grow into the interior of the filter elements. In this way the concentration of the active biomass can be kept extremely high. Regarding the elements, reference to application Ser. No. 536,077 is made.

Instead of forming a solid bed, it is also possible, to create a downwardly flowing fluidized bed by the use of floatable filter elements. Because of the buoyancy of the filter elements and with the flow being adjusted so that they do not go as far as the lower end or bottom of the reactor, despite the downflow. In this case, the arrangement of a grid or screen bottom in the lower area of the reactor can be omitted. Such a fluidized bed is obtained with carrier elements of equal or only slightly higher specific weight as compared to that of the surrounding liquid. Attached gas bubbles will make the particles rise to the surface where the gas bubbles are released. Gas-free elements will be soaked and pushed down by the downward flow till by production of gas bubbles the cycle starts again. Foamed plastic cubes are particularly suited for this process variation.

If in the above described reactor, the outlet for treated substrate were to be placed in the lower area of the reactor, a large part of the free, unfixed, suspended biomass would be carried off through the outlet and would no longer be available for use in the anaerobic decomposition process. In this case, despite the stabilizing effect of the recycle stream, with a flow typically more than ten times the flow of the influent stream, the risk of reactor failure due to overloading increases. Moreover, in the case of the outlet for treated substrate being connected in the upper area, i.e., to the top, of the reactor with downflow type operation, there is no way to prevent that part of the feed will be carried off untreated together with the discharge of the treated substrate. This would hamper the purification performance, i.e., efficiency of the reactor.

To elmininate these disadvantages, according to the invention, at least one riser pipe 11 passes through filter bed 3 of reactor 1, penetrates below the grid or screen bottom 2 and is connected to the upper area or top of reactor 1 to an outlet 10 for treated substrate, i.e., effluent. In the drawing, riser pipe 11 is designed to be open at the top and is surrounded by a receiving tank 12 that is also open at the top and is connected to outlet 10, so that the rising liquid overflows from riser pipe 11 into receiving tank 12 and from there goes into outlet 10. A distribution device 6 for influent substrate to be treated is placed over riser pipe 11 and receiving tank 12 in a manner such that the substrate to be treated does not mix with the treated substrate as is shown.

As a result of designing the riser pipe 11 to be open on the top and the overflowing of the treated substrate from riser pipe 11 passing into receiving tank 12, it is possible to discharge developing digester gas upward during the rising phase through the riser pipe 11. In this case, during the rise of the liquid through riser pipe 11, not only does a further decomposition process occur because of the biomass present in the liquid that is suspended and possibly fixed in the riser pipe, but the unfixed biomass gradually settles and sinks to the lower area of reactor 1. From there the deposited biomass passes into recycle pipe 4. Flushing out of unfixed biomass is thus avoided by the arrangement of the riser pipe so that the total concentration of biomass present in the reactor can be kept extremely high. Similarly, a mixing of feed and effluent is avoided, so that the discharge of treated substrate is not hampered by substrate to be treated.

As shown, it is advantageous for the riser pipes to have a corrugated and/or ribbed surface in the lower area, as a result of which they are especially well suited to provide additional settling surfaces for microorganisms. This effect is also favored by use of open-pore material for the riser pipes. In addition, the corrugated or ribbed surface causes vortexes between liquid and unfixed biomass, which intensifies the decomposition process. Since such vortexes impede settling of suspended biomass, the riser pipe in the upper area preferably has a flat design of the surface, i.e., straight wall. Upper area means the upper vertical reactor height, typically 20-30% of the total reactor height.

In place of the vertical arrangement of the riser pipe which has been shown, it is also possible to make the riser pipe of inclined or coiled construction through the filter bed 3, or coiled on the outside of the reactor to lengthen the reaction path.

Figure 2:
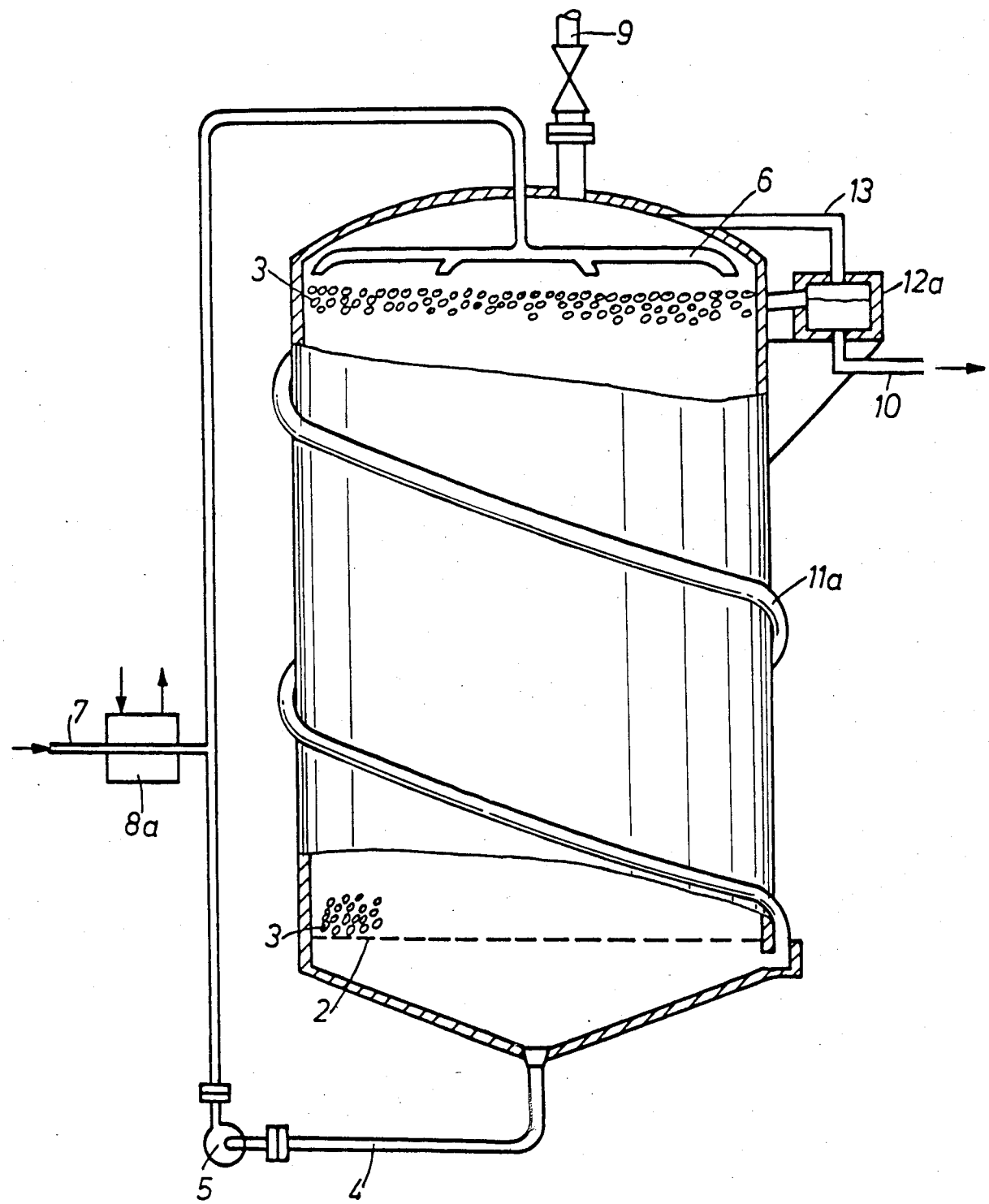
FIG. 2 illustrates an anaerobic reactor with at least one riser pipe located outside of the reactor.

Such a reactor with the riser pipes placed on the outside wall of the reactor is shown in FIG. 2.* By this arrangement the riser pipe 11a passes on the outside wall of the reactor 1 coiled in a spiral from the area of the reactor 1 below the grid or screen bottom 2 to the upper area of reactor 1 where it is connected to a closed receiving tank 12a. This receiving tank 12a is arranged on a support at the outside wall of the reactor 1 and is connected to outlet 10, so that the rising liquid overflows from riser pipe 11a into receiving tank 12a and from there goes into outlet 10. The digester gas developing during the anaerobic decomposition process in the riser pipe 11a is collected in the upper area of the receiving tank 12a and is fed from there via a line 13 to the top area of reactor 1 to be discharged through the gas outlet 9.

\* whereby the filter bed volume inside the reactor is not affected.

In place of a coiled arrangement of one or more riser pipes on the outside wall of the reactor it is also possible to make a vertical arrangement. In all cases it is advantageous for the riser pipes to have a corrugated and/or ripped surface in the lower part.

In the embodiment of FIG. 2 the heat exchanger 8a is placed in the influent pipe 7.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

There is provided below an embodiment example of a reactor according to the invention the performance of which is compared with a traditional upflow reactor and a traditional downflow filter bed reactor from which it is clear that in the case of the reactor according to the invention, the required reactor volume can be kept relatively small with constantly high decomposition performance.

NUMERICAL EXAMPLE

1. Effluent to be treated (e.g. distillery effluent)

| Feed | 1000 m$^3$/d; 41.7 m$^3$/h |
|---|---|
| COD | 10000 mg/l; 10,000 kg/d |

2. Prior art upward flow reactor

| | |
|---|---|
| COD decomposition | 90% = 9000 kg/d |
| CH$_4$ production | 0.35 m$^3$/kg Decomp. COD = 3150 m$^3$/d |
| CH$_4$ share | 55% |
| Gas yield | 5727 m$^3$/d |
| Maximum permissible specific gas production to avoid biomass losses | 4 m$^3$/m$^3$ reactor · d |
| Required reactor volume | 1432 m$^3$ |
| Volume load | 7 kg COD/m$^3$ · d |
| Volume decomposition performance | 6.3 kg COD/m$^3$ · d |

3. Prior art anaerobic filter with corrugated plastic rings, downflow operation, effluent equals equivalent quantity of feed+effluent mixture

| | |
|---|---|
| Circulation | = 15 × feed |
| Maximum degree of decomposition | 90% |
| Untreated feed shares in the effluent | 6.3% = 630 COD/d |
| Total elimination in the reactor | 9370 · 0.9 = 8433 kg COD/d |
| COD content in the effluent | 630 + 937 = 1567 kg COD/d |
| Actual degree of COD decomposition | 84.3% |
| Permissible sludge load | 0.5 g COD/kg TS · d |
| Required quantity of sludge | 20,000 kg |
| Sludge concentration | 25 kg/m$^3$ fixed biomass + 0.5 kg/m$^3$ suspended biomass |
| Total biomass concentration | 25.5 kg/m$^3$ |
| Required reactor volume | 784 m$^3$ |

4. Reactor according to the invention

| | |
|---|---|
| Circulation | = 15 × feed |
| Maximum degree of decomposition | 90% |
| Untreated feed share in the effluent | = 0% |
| Total elimination in the reactor | 9000 kg COD/d |
| Permissible sludge load | 0.5 kg COD/m$^3$/d |
| Required quantity of sludge | 20,000 kg |
| Sludge concentration | 25 kg/m$^3$ fixed biomass + 3 kg/m$^3$ suspended biomass = 28 kg/m$^3$ |
| Required reactor volume | 714 m$^3$ |

5. Comparison of the three reactor types

| Characteristics | Upflow Reactor | Anaerobic Filter Downflow Operation, Circulation | according to Invention |
|---|---|---|---|
| Reactor volume | 1432 m$^3$ | 784 m$^3$ | 714 m$^3$ |

-continued

| Characteristics | Upflow Reactor | Anaerobic Filter Downflow Operation, Circulation | according to Invention |
|---|---|---|---|
| COD decomposition | 90% | 84.3% | 90% |
| Volume load (COD) | 7 kg/m³ · d | 12.8 kg/m³ · d | 14 kg/m³ · d |
| Volume decomposition performance | 6.3 kg/m³ · d | 10.7 kg/m³ · d | 12.6 kg/m³ · d |
| Volatile acids in the effluent (odorous) | ≦200 mg/l | >800 mg/l | ≦200 mg/l |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the anaerobic decomposition of organic substrate in which organic substrate to be treated is conducted through a submerged filter bed arranged in a treatment zone or reactor, said filter bed being a carrier for settling biodegrading microorganisms therein or thereon, and substrate treated in the filter bed is partially recycled thereto, the improvment comprising conducting the organic substrate being treated in a downflow mode through said submerged filter bed to thereby treat said organic substrate, said recycling being conducted by separating a partial stream of substrate treated at the bottom of the treatment zone and passing it to the top, and conducting another partial stream of treated substrate in an upflow mode in contact with nicroorganisms fixed within conduit means through which said stream is passed and discharging treated effluent directly from said another partial stream from a region in the vicinity of the top of the treatment zone.

2. A process according to claim 1, wherein the upflow stream is conducted partially along an inclined path.

3. A process according to claim 1, wherein the upflow stream is conducted partially along a coiled path.

4. A process according to claim 1, wherein said upflow stream is passed during at least the upper area of its flow in a straight path mode to enhance settling of solids thereon.

5. A process according to claim 1 wherein said filter bed is non-fluidized.

6. A process according to claim 1 wherein the microorganisms fixed within conduit means are fixed within the pores of a lyaer of foamed plastic within the conduit means.

7. A process according to claim 6 wherein said filter bed is non-fluidized.

8. A process according to claim 6 wherein said conduit means further comprises on the exterior surface thereof a plastic foam layer of open pore structure.

* * * * *